United States Patent [19]
Kim

[11] Patent Number: 5,959,698
[45] Date of Patent: Sep. 28, 1999

[54] POLY PHASE FILTER FOR DOT SEQUENTIAL COLOR DIFFERENCE SIGNAL CONVERSION

[75] Inventor: Ji Ho Kim, Seoul, Rep. of Korea

[73] Assignee: Samsung Electronics Co., Ltd., Kyungki-do, Rep. of Korea

[21] Appl. No.: 08/735,063

[22] Filed: Oct. 18, 1996

[30] Foreign Application Priority Data

Oct. 26, 1995 [KR] Rep. of Korea .................. 95-37406

[51] Int. Cl.[6] ........................ H04N 9/64; G06F 17/10
[52] U.S. Cl. .................. 348/708; 348/708; 348/709; 348/710; 364/724.012; 364/724.05; 364/724.1; 364/724.15; 364/724.16
[58] Field of Search ................... 364/724.011–724.2; 348/708, 709, 710, 712, 713

[56] References Cited

U.S. PATENT DOCUMENTS 5,068,716 11/1991 Takayami et al. ............... 358/13
5,307,157 4/1994 Kobayashi et al. ............... 348/708

*Primary Examiner*—Andrew I. Faile
*Assistant Examiner*—Mark W. Hrozenchik
*Attorney, Agent, or Firm*—Sughrue, Mion, Zinn, Macpeak & Seas, PLLC

[57] ABSTRACT

A poly phase filter for converting a sampling frequency of a digital video signal to perform a dot sequential color difference signal conversion operation, the digital video signal including a luminance signal and a color difference signal, the color difference signal including two color difference signal components. The poly phase filter is adapted to generate a plurality of poly phase filter coefficients to be used to process the luminance signal and to process the color difference signal. The poly phase filter is also adapted to process the generated poly phase filter coefficients in units of two to process the color difference signal. Therefore, the present invention has the effect of reducing the hardware size and the associated cost.

4 Claims, 4 Drawing Sheets

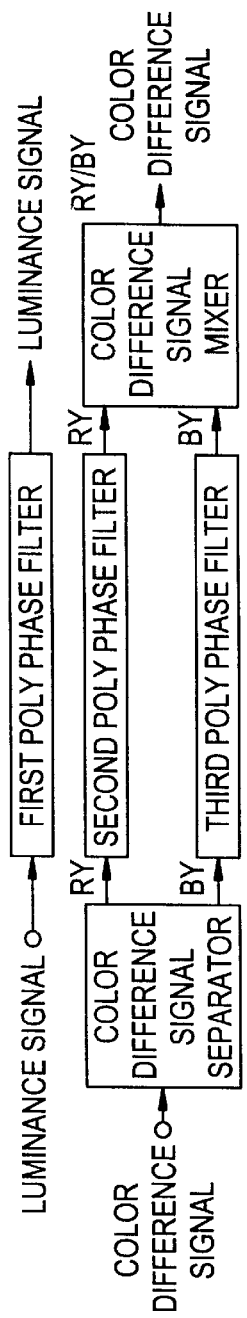

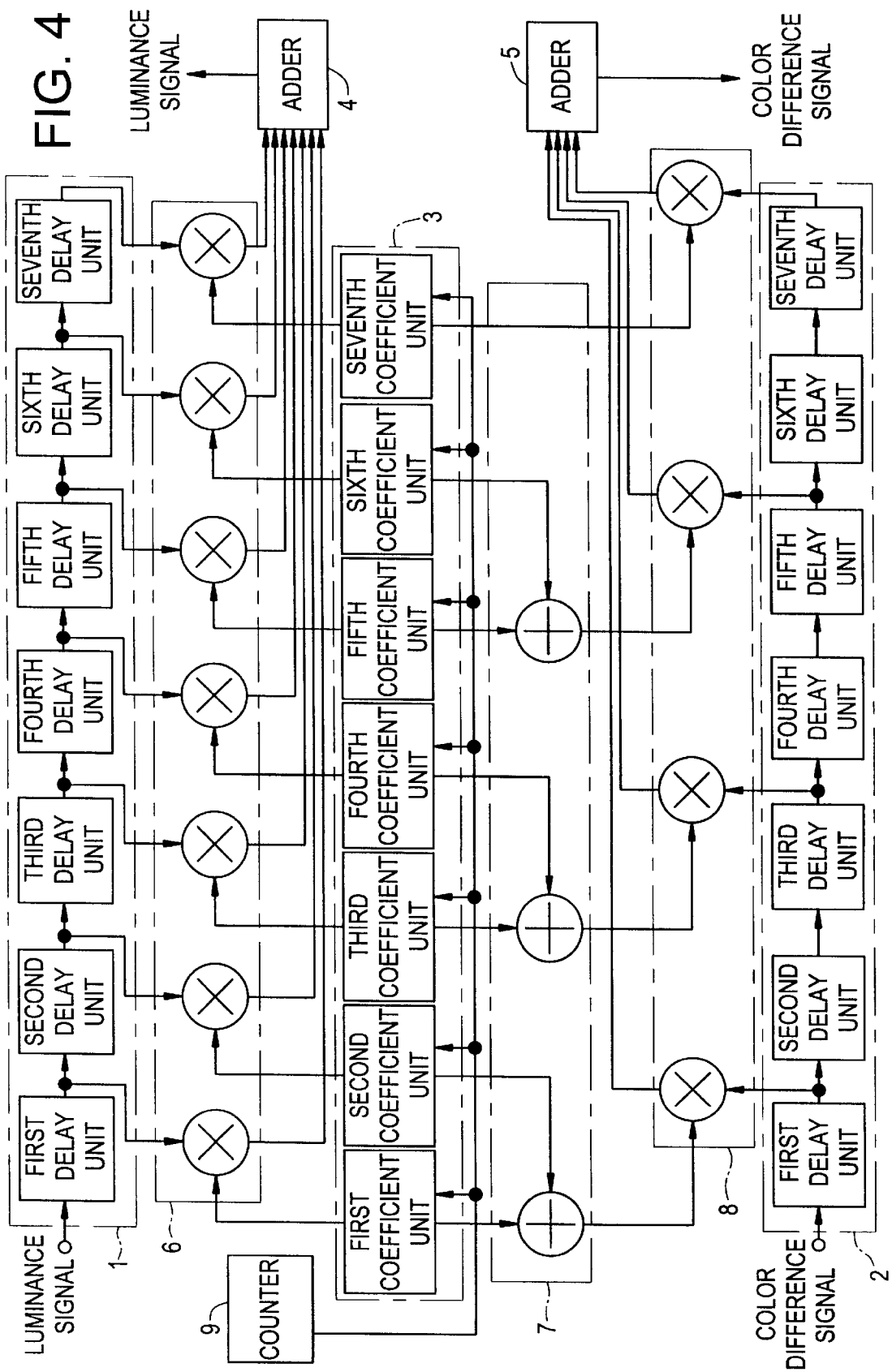

FIG. 5A
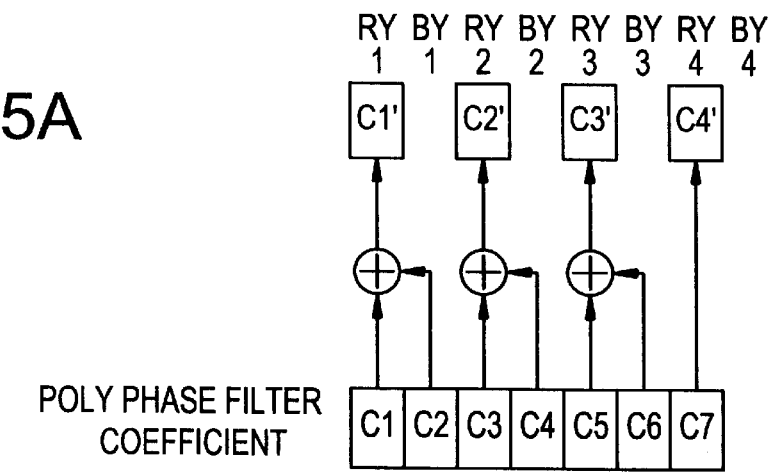
FIG. 5B
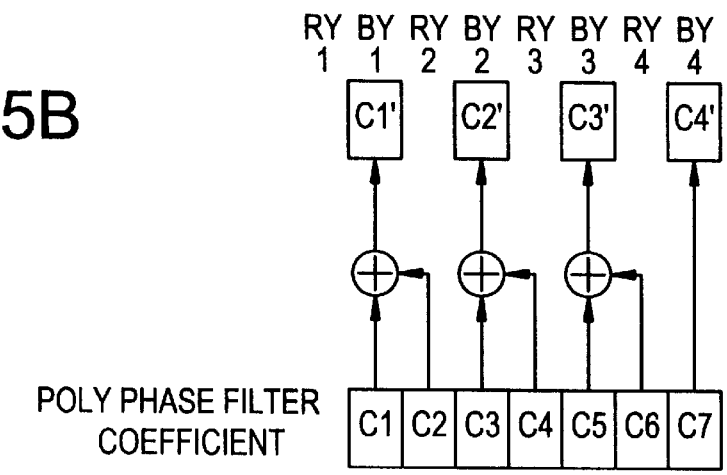
FIG. 5C
RY1x(C1+C2)+RY2x(C3+C4)+RY3x(C5+C6)+RY4xC7
BY1x(C1+C2)+BY2x(C3+C4)+BY3x(C5+C6)+BY4xC7

POLY PHASE FILTER FOR DOT SEQUENTIAL COLOR DIFFERENCE SIGNAL CONVERSION

BACKGROUND OF THE INVENTION

Field of the Invention

The present invention relates generally to poly phase filters for dot sequential color difference signal conversion. More particularly, the invention relates to a poly phase filter having simple hardware construction which is capable of filtering luminance Y and color difference signals RY/BY of a digital video signal.

Generally, the input conditions of an SD VCR are a luminance signal Y of 13.5 MHz and a color difference signal RY/BY of 13.5 MHz. In order to satisfy such input conditions of the SD VCR in the case where a digital video signal of 14.3 MHz (4 Fsc) is applied to the SD VCR, the digital video signal of 14.3 MHz is converted into an analog video signal of 14.3 MHz. The resulting 14.3 MHz analog signal is in turn, converted into an analog video signal of 13.5 MHz. The analog video signal of 13.5 MHz is again converted into a digital video signal of 13.5 MHz.

This multi-conversion method for converting the 14.3 MHz digital video signal into a 13.5 MHz digital video signal is disadvantageous because a signal loss results from each respective conversion step, resulting in inefficiency in the signal processing.

Alternatively, the digital video signal of 14.3 MHz may be converted directly into the digital video signal of 13.5 MHz according to a frequency sampling program, as shown in FIG. 1.

FIG. 1 is a schematic block diagram illustrating the construction of a conventional N-tap poly phase filter for conversion of digital signals. As shown in this drawing, the conventional N-tap poly phase filter comprises a delay group and a coefficient group. The delay group includes a plurality of delay units for sequentially delaying input data, and the coefficient group includes a plurality of coefficient units. Each coefficient unit outputs a phase filter coefficient to be multiplied by data output from a corresponding delay unit in the delay group. Each of the coefficient units includes k different poly phase filter coefficients which are periodically and repeatedly output from the coefficient units by a counter.

The conventional N-tap poly phase filter further comprises an adder for adding all the results obtained by multiplying 1) the output data from the delay units in the delay group by 2) the poly phase filter coefficients from corresponding coefficient units in the coefficient group. The output of the adder is provided as the final output of the poly phase filter in a manner similar to a general digital filter.

A point of distinction between the poly phase filter and a general digital filter is that coefficient variation is performed in a poly phase filter. The digital filter may perform an inaccurate operation in response to the input signal since the filter does not provide poly phase filter coefficient variation. The poly phase filter can perform the poly phase filter coefficient variation to make up for the deficiency of the digital filter and to ensure more accurate operation.

FIG. 2 is a schematic block diagram illustrating a dot sequential color difference signal conversion method using the conventional N-tap poly phase filter in FIG. 1, and FIGS. 3A to 3G are views illustrating the operation of FIG. 2. In order to convert luminance signal Y and color difference signal RY/BY of 14.3 MHz into a luminance signal Y and color difference signal RY/BY of 13.5 MHz, respectively, the 14.3 MHz luminance signal Y and color difference signal RY/BY are first separated from each other. The color difference signal RY/BY is then separated into color difference signal components RY and BY. Then, the luminance signal Y and color difference signal components RY and BY are filtered by corresponding poly phase filters.

In the case where a 7-tap poly phase filter is used, an input color difference signal RY/BY, as shown in FIG. 3A, is separated into a color difference signal component RY, as shown in FIG. 3B, and a color difference signal component BY as shown in FIG. 3E. The separated color difference signal component RY is filtered in a convolutional manner with poly phase filter coefficients such as that shown in FIG. 3C. The filtered result is shown in FIG. 3D.

On the other hand, the separated color difference signal component BY is filtered in a convolutional manner with poly phase filter coefficients as shown in FIG. 3F. The filtered result is shown in FIG. 3G.

The method for converting the 14.3 MHz digital video signal directly into a 13.5 MHz digital video signal according to the frequency sampling program of FIG. 1 has a disadvantage in that it requires a plurality of poly phase filters, one for each of the luminance signal Y and color difference signal components RY and BY. This requirement for multiple poly phase filters increases the hardware size of the converting apparatus and its associated cost.

SUMMARY OF THE INVENTION

In view of the above problems, and it is an object of the present invention to provide a poly phase filter for dot sequential color difference signal conversion in which poly phase filter coefficients are commonly used in the conversion steps of a luminance signal Y and color difference signal components RY and BY of a digital video signal, so that the luminance signal and the color difference signal components RY and BY can be filtered by a simple hardware construction.

In accordance with the present invention, the above and other objects can be accomplished by providing a poly phase filter for converting a sampling frequency of a digital video signal to perform dot sequential color difference signal conversion, said digital video signal including a luminance signal and a color difference signal, said color difference signal including two color difference signal components, said filter comprising: means for generating a plurality of phase filter coefficients, said coefficients being commonly used to process the luminance signal and the color difference signal; and means for processing the generated poly phase filter coefficients in groups of two, to process the color difference signal components.

More specifically, the present invention provides a poly phase filter including:
 a poly phase filter for converting a sampling frequency of
  a digital video signal to perform dot sequential color
  difference signal conversion, said digital video signal
  including a luminance signal and a color difference
  signal, said color difference signal including two color
  difference signal components, said filter comprising:
   a first delay group, said first delay group including a
    plurality of first delay units for sequentially delaying
    the luminance signal;
   a second delay group, said second delay group including a plurality of second delay units for sequentially
    delaying the color difference signal;
   a coefficient group, said coefficient group including a
    plurality of coefficient units for generating a plurality of poly phase filter coefficients, said coefficients being commonly used for process the luminance signal and the color difference signal;

a first multiplier group, said first multiplier group including a plurality of first multipliers, each of said plurality of first multipliers multiplying the output data from a corresponding one of said plurality of first delay units of said first delay group by a poly phase filter coefficient from a corresponding one of said plurality of coefficient units of said coefficient group;

an adder group for adding poly phase filter coefficients from said coefficient units in said coefficient group in groups of two, said adder group including a plurality of first adders, each of said plurality of first adders adding the poly phase filter coefficients from corresponding two of said plurality of coefficient units of said coefficient group;

a second multiplier group, said second multiplier group including a plurality of second multipliers, each of said plurality of second multipliers multiplying the output data from a corresponding odd numbered delay unit of said plurality of second delay units of said second delay group with output data from at least one of:
 a) one of said first adders of said adder group and
 b) the last coefficient unit in said coefficient group;

a second adder for adding all output data from said first multipliers in said first multiplier group and outputting the added result as a filtered luminance signal;

a third adder for adding all output data from said second multipliers in said second multiplier group and outputting the added result as a filtered color difference signal; and a counter for varying the poly phase filter coefficients from said coefficient units in said coefficient group during each clock period.

The above means is adapted to process the generated poly phase filter coefficients in group of two taps to filter the same color difference signal component every two clock periods.

BRIEF DESCRIPTION OF THE DRAWINGS

The above objects, features and advantages of the present invention will be more clearly understood from the following detailed description of a preferred embodiment taken in conjunction with the accompanying drawings, in which:

FIG. 2 is a schematic block diagram illustrating a dot sequential color difference signal conversion method using the conventional N-tap poly phase filter in FIG. 1;

FIGS. 3A to 3G are views illustrating the operation of a conventional N tap poly phase filter;

FIG. 4 is a schematic block diagram illustrating the construction of a poly phase filter for dot sequential color difference signal conversion in accordance with the present invention; and FIGS. 5A to 5C are views illustrating the operation of the poly phase filter in FIG. 4.

DETAILED DESCRIPTION OF THE PREFERRED EMBODIMENTS

Figure 1:
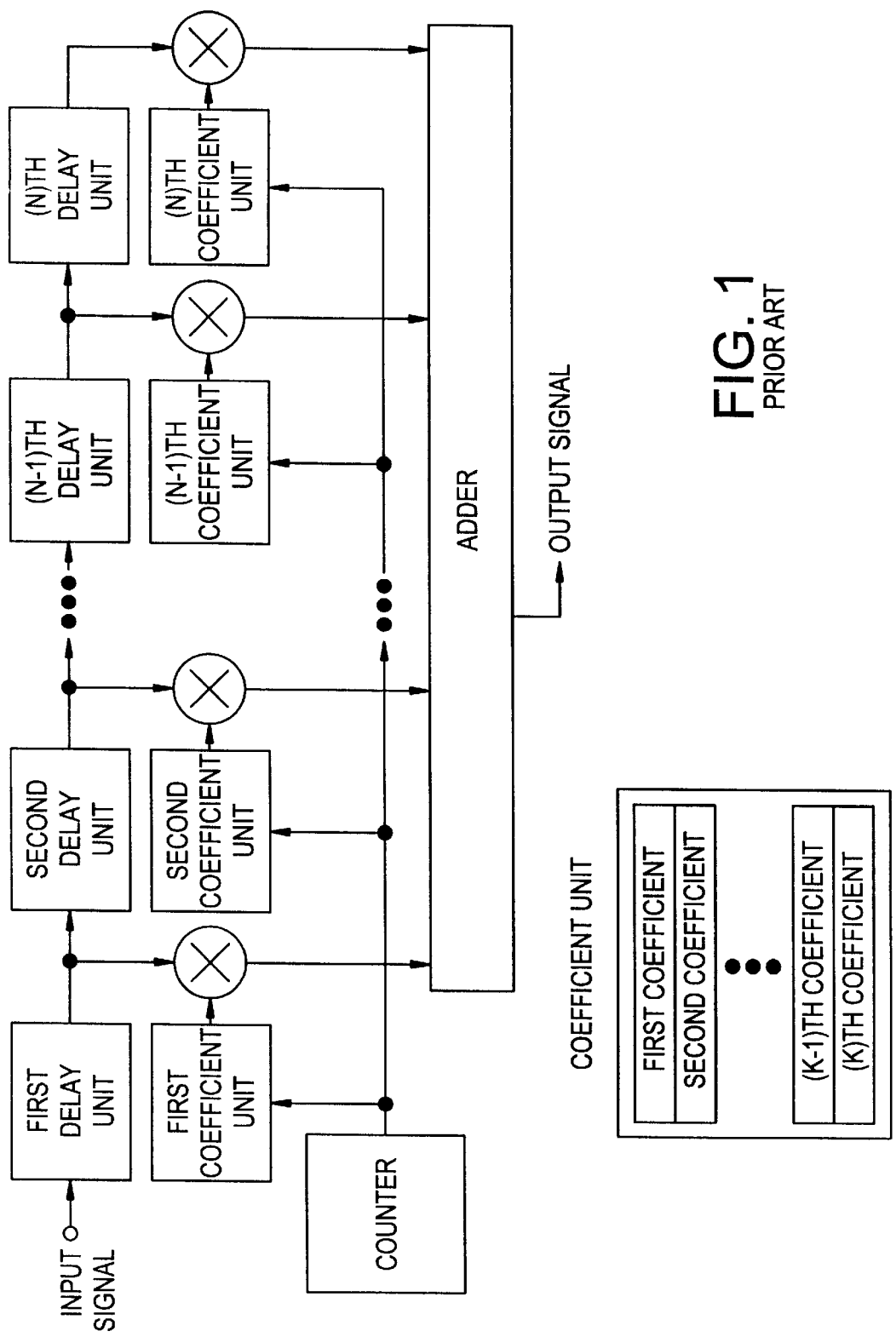
FIG. 1 is a schematic block diagram illustrating the construction of a conventional N-tap poly phase filter for digital frequency conversion.

Referring to FIG. 4, there is shown in block form the construction of a poly phase filter for dot sequential color difference signal conversion in accordance with the present invention. The poly phase filter comprises first and second delay groups 1 and 2 and a coefficient group 3. The first delay group 1 includes a plurality of delay units for sequentially delaying a luminance signal Y of a digital video signal, and the second delay group 2 includes a plurality of delay units for sequentially delaying a color difference signal RY/BY of the digital video signal. The coefficient group 3 is adapted to generate a plurality of poly phase filter coefficients to be multiplied by output data from the delay units in the first and second delay groups 1 and 2. To this end, the coefficient group 3 includes a plurality of coefficient units. Each of the coefficient units includes a plurality of coefficients which are output in a manner similar to that described with respect to FIG. 1.

The poly phase filter further comprises first and second multiplier groups 6 and 8 and an adder group 7. The first multiplier group 6 includes a plurality of multipliers, each of which multiplies the output data from a corresponding delay unit in the first delay group 1 by the poly phase filter coefficient from a corresponding coefficient unit in the coefficient group 3. The adder group 7 is adapted to add the poly phase filter coefficients from the coefficient units in the coefficient group 3 in groups of two taps. To this end, the adder group 7 includes a plurality of adders, each of which adds the poly phase filter coefficients from two of the coefficient units in the coefficient group 3. The second multiplier group 8 includes a plurality of multipliers, each of which multiplies the output data from a corresponding odd numbered delay unit in the second delay group 2 by output data from a corresponding adder in the adder group 7. The output of last coefficient unit in the coefficient group 3 is multiplied directly with the output of the last delay unit of delay group 2.

The poly phase filter further comprises a first adder 4 for adding all output data from the multipliers in the first multiplier group 6 and outputting the added result as a filtered luminance signal. The filter also comprises a second adder 5 for adding all output data from the multipliers in the second multiplier group 8 and outputting the added result as a filtered color difference signal.

In FIG. 4, the reference numeral 9 designates a counter for varying the poly phase filter coefficients from the coefficient units in the coefficient group 3 according to a predetermined clock period.

The operation of filtering the luminance signal Y of the digital video signal is performed in the same manner as that shown in FIG. 2. However, the operation of filtering the color difference signal RY/BY of the digital video signal is performed in a different manner from that described in FIG. 2. Specifically, according to the present invention, the color difference signal RY/BY is not separated into color difference signal components RY and BY but rather is processed in a combined dot sequential manner. Further, the poly phase filter coefficients for the color difference signal components RY and BY are individually processed, and the poly phase filter coefficients for the luminance signal Y are commonly processed.

The operation of the above-constructed poly phase filter for the dot sequential color difference signal conversion will hereinafter be described in detail with reference to FIGS. 5A to 5C.

FIGS. 5A to 5C are views illustrating the operation of the poly phase filter in FIG. 4. FIG. 5A shows processing of the poly phase filter coefficients which is a feature of the present invention. A 7-tap poly phase filter is shown for illustrative purposes. The coefficients of the 7-tap poly phase filter are processed in groups of two.

As shown in FIG. 5A, in order to process the color difference signal component RY of the combined color difference signal RY/BY, a new coefficient is produced by adding a poly phase filter coefficient for the color difference signal component BY of the color difference signal RY/BY to a poly phase filter coefficient for the color difference signal component RY.

That is, in order to process the color difference signal component RY in the case where the color difference signal components RY and BY are sequentially arranged, odd coefficients for the color difference signal component RY and even coefficients for the color difference signal component BY are arranged in such a manner that the coefficients correspond to the color difference signal components RY and BY. New coefficients for the color difference signals are produced by adding adjacent odd and even coefficients from odd and even numbered coefficient units in groups of two. Then, the color difference signal component RY is filtered in a convolutional manner with the new coefficients.

Thereafter, the color difference signal components RY and BY are shifted from their present positions to the left or right by one space as shown in FIG. 5B because the signals are delayed by one period. As a result, the color difference signal component BY is filtered in a convolutional manner according to the new coefficients in the same manner as that of the color difference signal component RY.

The filtered results are shown in FIG. 5C. As shown in this drawing, the filtered results are the same as those in FIGS. 3D and 3G. As a result, although the color difference signal RY/BY is not separated into the color difference signal components RY and BY, the filtering effect can be obtained as in the case where the color difference signal RY/BY is separated into the color difference signal components RY and BY.

As is apparent from the above description, according to the present invention, one poly phase filter is commonly used for processing the luminance signal Y and color difference signal RY/BY. Therefore, the present invention has the effect of reducing the hardware size and the associated cost as compared to the apparatus of FIG. 2.

Although a preferred embodiment of the present invention has been disclosed for illustrative purposes, those skilled in the art will appreciate that various modifications, additions and substitutions are possible, without departing from the scope and spirit of the invention as described in the accompanying claims.

What is claimed is:

1. A poly phase filter for converting a sampling frequency of a digital video signal to perform dot sequential color difference signal conversion, said digital video signal including a luminance signal and a color difference signal, said color difference signal including two color difference signal components, said filter comprising:
   means for generating a plurality of poly phase filter coefficients, said coefficients being used to process the luminance signal and the color difference signal; and
   means for processing the generated poly phase filter coefficients in groups of two to process the color difference signal components.

2. A poly phase filter for converting a sampling frequency of a digital video signal to perform dot sequential color difference signal conversion, said digital video signal including a luminance signal and a color difference signal, said color difference signal including two color difference signal components, said filter comprising:
   a first delay group, said first delay group including a plurality of first delay units for sequentially delaying the luminance signal;
   a second delay group, said second delay group including a plurality of second delay units for sequentially delaying the color difference signal;
   a coefficient group, said coefficient group including a plurality of coefficient units for generating a plurality of poly phase filter coefficients, said coefficients being commonly used to process the luminance signal and the color difference signal;
   a first multiplier group, said first multiplier group including a plurality of first multipliers, each of said plurality of first multipliers multiplying the output data from a corresponding one of said plurality of first delay units of said first delay group by a poly phase filter coefficient from a corresponding one of said plurality of coefficient units of said coefficient group;
   an adder group for adding poly phase filter coefficients from said coefficient units in said coefficient group in groups of two, said adder group including a plurality of first adders, each of said plurality of first adders adding the poly phase filter coefficients from corresponding two of said plurality of coefficient units of said coefficient group;
   a second multiplier group, said second multiplier group including a plurality of second multipliers, each of said plurality of second multipliers multiplying the output data from a corresponding odd numbered delay unit of said plurality of second delay units of said second delay group with output data from at least one of:
      a) a corresponding one of said first adders of said adder group and
      b) the last coefficient unit in said coefficient group;
   a second adder for adding all output data from said first multipliers in said first multiplier group and outputting the added result as a filtered luminance signal;
   a third adder for adding all output data from said second multipliers in said second multiplier group and outputting the added result as a filtered color difference signal; and
   a counter for varying the poly phase filter coefficients from said coefficient units in said coefficient group during each clock period.

3. A poly phase filter as set forth in claim 1, wherein said processing means is adapted to process the generated poly phase filter coefficients in groups of two, to filter one of the two color difference signal components every two clock periods.

4. A poly phase filter as set forth in claim 2, wherein said counter is further adapted to process the generated poly phase filter coefficients in groups of two, to filter one of the two color difference signal components every two clock periods.

* * * * *